(No Model.)
G. SIBLEY.
FLEXIBLE SHAFT.
No. 416,427. Patented Dec. 3, 1889.
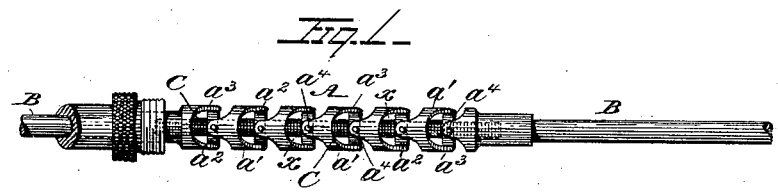
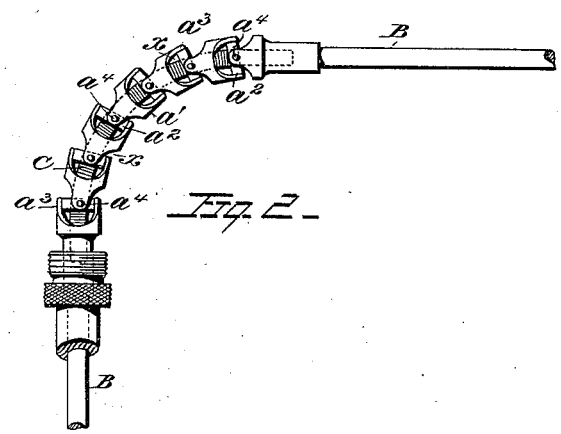
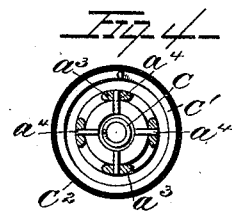
WITNESSES:
John Nolan
H. V. Buckley
INVENTOR
Gideon Sibley,
BY Joshua Pusey
ATTORNEY

UNITED STATES PATENT OFFICE.

GIDEON SIBLEY, OF PHILADELPHIA, PENNSYLVANIA.

FLEXIBLE SHAFT.

SPECIFICATION forming part of Letters Patent No. 416,427, dated December 3, 1889.

Application filed April 22, 1889. Serial No. 308,190. (No model.)

*To all whom it may concern:*

Be it known that I, GIDEON SIBLEY, a citizen of the United States, residing at the city and county of Philadelphia and State of Pennsylvania, have invented certain new and useful Improvements in Flexible Shafts or Couplings, of which the following is a full, clear, and exact description, reference being had to the accompanying drawings, of which—

Figure 1 is a side elevation of my improved shaft. Fig. 2 is a similar view of the same flexed. Fig. 3 is a longitudinal section thereof with an external supporting tube and cover. Fig. 4 is a full transverse section, as on the line $x$ $x$, Fig. 3.

The object of this invention is to provide a flexible shaft or coupling whose action at any flexure shall be steady and uniform and unattended by the unsteady motion or "backlash" heretofore incident to flexible shafts of well-known construction; and to this end the invention consists in the combination of a series of universal joints composed of tubular sections and a series of alternating interposed rings or disks, to which the ends of each of said sections are pivoted at right angles to each other, the arrangement being such that the adjacent or opposite ends of the adjoining sections will be oppositely pivoted, thus forming a series of universal joints, together with a flexible rod or bar for sustaining said pivoted sections in proper position, all as hereinafter more fully described and definitely claimed.

The invention consists, also, in certain details of construction, which will be duly pointed out.

Referring to the annexed drawings, A represents the flexible shaft or coupling. To its ends the rigid shafts or spindles B are secured. Shaft A is composed of a series of universal joints, which consist in the present instance of short tubular sections $a'$, which are disposed longitudinally, and between the adjacent ends of each adjoining pair is interposed a ring or disk $a^2$, to which said ends are pivoted at right angles to each other, the opposite ends of each section being also pivoted at right angles to each other, as seen. The ends of the tubes $a'$ are cut away at $x$, thus forming the lugs $a^3$, through which the pivot-pins $a^4$ extend, and permitting the adjoining sections to be movable in opposite directions within certain limits. Extending centrally through the series is a flexible rod C, which supports the sections and preserves the alignment thereof in any position they may assume. This supporter is preferably, though not necessarily, composed of spirally-wound spring-wire, as shown. A flexible external surrounding hollow rod or tube—such as the coiled spring $C'$—may be used in lieu of or in addition to the rod C, if desired. The coil $C'$ also forms a support for a covering and protecting sleeve $C^2$, of leather or other suitable flexible material, which I prefer to use.

A flexible shaft of the above-described construction will be steady and uniform in its action whatever be the flexure thereof, and it is therefore especially (but not exclusively) adapted for use in connection with dental engines, the flexible shafts whereof heretofore having an unsteady motion or backlash, which I have found objectionable in practical use.

Having thus described my invention, I claim as new and wish to secure by Letters Patent—

1. The flexible shaft consisting of the combination of the tubular recessed sections and the interposed rings or disks, to which said sections are pivoted, substantially as shown and described, together with the flexible supporting-rod, substantially as and for the purpose set forth.

2. The flexible shaft consisting of the combination of the tubular recessed sections, the interposed rings or disks to which said sections are pivoted in the relation specified, the internal flexible rod C, the external tube $C'$, and the flexible covering $C^2$, substantially as and for the purpose set forth.

In testimony whereof I have hereunto affixed my signature this 16th day of March, A. D. 1889.

GIDEON SIBLEY.

Witnesses:
JOHN NOLAN,
GEO. W. REED.